(12) United States Patent
Sugimoto et al.

(10) Patent No.: US 6,238,018 B1
(45) Date of Patent: May 29, 2001

(54) PROCESS FOR CONTROLLING BRAKING-FORCE DISTRIBUTION IN VEHICLE

(75) Inventors: Yoichi Sugimoto; Yoshihiro Urai; Hideki Kubonoya, all of Wako (JP)

(73) Assignee: Honda Giken Kogyo Kabushiki Kaisha, Minato-ku (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/673,180

(22) Filed: Jun. 26, 1996

(30) Foreign Application Priority Data

Jun. 29, 1995 (JP) .................................... 7-163861

(51) Int. Cl.⁷ ................................................ B60T 8/30
(52) U.S. Cl. ........................ 303/146; 303/147; 303/186
(58) Field of Search ...................... 303/146, 147, 303/148, 149, 186, 113.5, 9.62

(56) References Cited

U.S. PATENT DOCUMENTS

| | | | |
|---|---|---|---|
| 4,881,785 | * 11/1989 | Ushijima et al. | 303/146 |
| 5,021,957 | * 6/1991 | Yoshino et al. | 303/149 |
| 5,150,951 | * 9/1992 | Leiber | 303/146 |
| 5,211,453 | * 5/1993 | Van Zanten et al. | 303/146 |
| 5,375,917 | * 12/1994 | Inagaki | 303/186 |
| 5,407,259 | * 4/1995 | Itabashi et al. | 303/47 |
| 5,551,771 | * 9/1996 | Akuzawa et al. | 303/186 |

FOREIGN PATENT DOCUMENTS

| | | | |
|---|---|---|---|
| 4208581A1 | 5/1993 | (DE) . | |
| 4226646A1 | 2/1994 | (DE) . | |
| 51-26584 | 8/1976 | (JP) . | |
| 404257757 | * 9/1992 | (JP) | 303/147 |
| 6-144178 | 5/1994 | (JP) . | |
| 6-156249 | 6/1994 | (JP) . | |

* cited by examiner

Primary Examiner—Matthew C. Graham
(74) Attorney, Agent, or Firm—Arent Fox Kintner Plotkin & Kahn, PLLC

(57) ABSTRACT

A braking-force distribution control process controls the front and rear wheel braking-force distribution in a vehicle by regulating the braking liquid pressure ratio for front and rear wheel brakes, based on differences between front wheel speeds and rear wheel speeds. When an abrupt turning state is determined, the braking liquid pressure distribution ratio for the rear brakes is decreased as compared with when the abrupt turning state is not detected. Thus, when braking during a sudden turning of the vehicle, a sudden increase in yaw rate can be inhibited to enhance the steerage stability performance of the vehicle.

5 Claims, 5 Drawing Sheets

PROCESS FOR CONTROLLING BRAKING-FORCE DISTRIBUTION IN VEHICLE

BACKGROUND OF THE INVENTION

1. Field of the Invention

The present invention relates to a process for controlling a braking-force distribution in a vehicle. Front and rear wheel braking-force distribution is controlled by regulating a braking liquid pressure ratio for front and rear wheel brakes, based on a difference between front and rear wheel speeds.

2. Description of the Related Art

Techniques for controlling a front and rear wheel braking-force distribution to eliminate the difference between the front and rear wheels, and to achieve an ideal braking-force distribution are conventionally known, from Japanese Patent Publication No.51-26584, Japanese Patent Application Laid-open No.6-144178 and the like.

In such known techniques, optimal braking forces, corresponding to loads applied to front and rear wheels, are provided by conducting the control of the front and rear wheel braking-force distribution to eliminate the difference between the front and rear wheel speeds. This is based on the following principle: when a braking force B is generated for a tire receiving a vertical drag force N from a road surface, a slip rate $\lambda$ of the tire is represented, simplistically, in a very small region by the following equation:

$$\lambda = K \times (B/N)$$

(wherein K is a constant)

The ideal braking-force distribution is to ensure that the front and rear wheel braking forces are proportional to the vertical drag force. Therefore, the front and rear wheel slip rates $\lambda$ may be equalized. Thus, if the vehicle speed is represented by $V_V$, and the wheel speed is represented by $V_W$, the slip rate $\lambda$ is determined according to the following equation:

$$\lambda = (V_V - V_W)/V_V$$

Therefore, if the braking-force distribution is controlled so that the front and rear wheel speeds $V_W$ are equal to each other, the front and rear wheel slip rates $\lambda$ can be equalized. More specifically, control is conducted so that the rear wheel speed $V_W$ is equal to the front wheel speed $V_W$ by controlling the braking liquid pressure for the rear wheels.

In the known techniques, however, the behavior of the entire vehicle is not taken into consideration, and depending upon the operational state of the vehicle, there is a room for improvement in an aspect of steerage stability performance, especially, during braking when the vehicle is abruptly turning.

SUMMARY OF THE INVENTION

Accordingly, it is an object of the present invention to provide a process for controlling the braking-force distribution in a vehicle, wherein a sudden increase in yaw rate is inhibited during braking during a sudden turn of the vehicle, thereby further enhancing the steerage stability performance.

To achieve the above object, according to the present invention, there is provided a process for controlling a braking-force distribution in a vehicle. Front and rear wheel braking-force distribution is controlled by regulating a braking liquid pressure ratio for front and rear wheel brakes, based on a difference between front and rear wheel speeds. The process comprises the steps of: detecting whether the vehicle is in an abrupt turning state; and decreasing the braking liquid pressure distribution ratio for the rear brakes when the abrupt turning state is detected, as compared with the case where the abrupt turning state is not detected.

With such a feature of the present invention, when braking during a sudden turn of the vehicle, the braking force for the rear wheels is suppressed, whereby a reduction in lateral force to the tires of the rear wheels can be prevented to inhibit a sudden increase in yaw rate, thereby insuring stability of the vehicle.

According to another aspect and feature of the present invention, the abrupt turning state of the vehicle is detected based on comparison of a) a differentiation value of a product of a vehicle speed and a yaw rate of a vehicle body with b) a preset value. Thus, it is possible to accommodate the variation in physical limit of the yaw rate in accordance with the vehicle speed by detecting an abrupt turning state of the vehicle based on the differentiation value of the product of the vehicle speed and the yaw rate of the vehicle body. Especially, during high-speed traveling in which the physical limit of the yaw rate is lowered, the stability of the vehicle can be effectively insured.

According to a further aspect and feature of the present invention, the vehicle speed is presumed based on at least one of the front wheel speeds and the rear wheel speeds, and the yaw rate of the vehicle body is presumed based on a difference between the left and right rear wheel speeds. Thus, an expensive sensor for directly detecting the yaw rate is not required. In addition, when gripping of a rear one of the inner wheels, as viewed during turning of the vehicle, approaches a limit so that slipping starts to increase, the presumed value of the yaw rate provided using the left and rear wheel speeds is suddenly increased. Therefore, a critical situation of the rear wheel tires can be detected more sensitively than the direct detection of the yaw rate which is a variation in behavior of the vehicle body, and thus, control can be started immediately.

According to a yet further aspect and feature of the present invention, a rear wheel deceleration is calculated based on the rear wheel speeds. The regulation of the braking liquid pressure distribution ratio is carried out under a condition that the rear wheel deceleration exceeds a preset value. Thus, unnecessary control can be more effectively inhibited by defining a timing for starting the regulation of the front and rear wheel braking-force distribution depending upon the situation of the rear wheel tires.

The above and other objects, features and advantages of the invention will become apparent from the following detailed description of the preferred embodiment taken in conjunction with the accompanying drawings.

DETAILED DESCRIPTION OF THE PREFERRED EMBODIMENT

Figure 1:
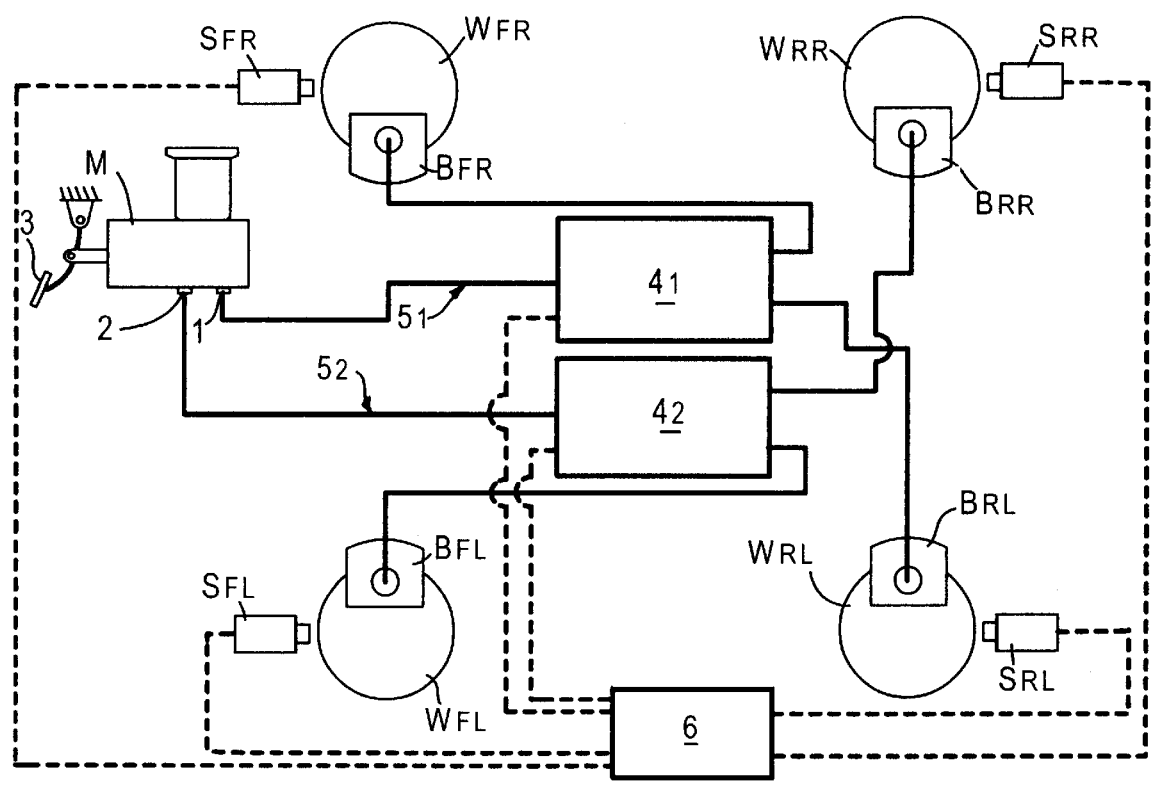
FIG. 1 is a diagrammatic illustration of a liquid pressure circuit of a brake system according to an embodiment of the present invention.

A first embodiment of the present invention applied to a front wheel drive vehicle will now be described with reference to FIGS. 1 to 5. Referring first to FIG. 1, a brake pedal 3 is operatively connected to a tandem-type master cylinder M having first and second output ports 1 and 2. Independent liquid pressures are output from the first and second output ports 1 and 2 in the master cylinder M in response to depression of the brake pedal 3.

A first braking liquid pressure system $5_1$, including a braking pressure regulating means $4_1$, is connected to the first output port 1. A right front wheel brake $B_{FR}$, mounted on a right front wheel $W_{FR}$, and a left rear wheel brake $B_{RL}$, mounted on a left rear wheel $W_{RL}$, are connected to the first braking liquid pressure system $5_1$. A second braking liquid pressure system $5_2$, including a braking pressure regulating means $4_2$, is connected to the second output port 2. A left front wheel brake $B_{FL}$, mounted on a left front wheel $W_{FL}$, and a right rear wheel brake $B_{RR}$, mounted on a right rear wheel $W_{RR}$, are connected to the second braking liquid pressure system $5_2$. Each of the brakes $B_{FL}$, $B_{FR}$, $B_{RL}$ and $B_{RR}$ exhibits a braking force corresponding to a braking liquid pressure applied thereto. Each of the brakes may be a disk brake.

Rotational speeds of the left and right front wheels $W_{FL}$ and $W_{FR}$ are detected by left and right front wheel rotational speed sensors $S_{FL}$ and $S_{FR}$, respectively. Rotational speeds of the left and right rear wheels $W_{RL}$ and $W_{RR}$ are detected by left and right rear wheel rotational speed sensors $S_{RL}$ and $S_{RR}$, respectively. Detection values detected by the rotational speed sensors $S_{FL}$, $S_{FR}$, $S_{RL}$ and $S_{RR}$ are input to an electronic control unit 6. The electronic control unit 6 controls the operation of the braking pressure regulating means $4_1$ and $4_2$ based on the detection values detected by the rotational speed sensors $S_{FL}$, $S_{FR}$, $S_{RL}$ and $S_{RR}$.

Figure 2:
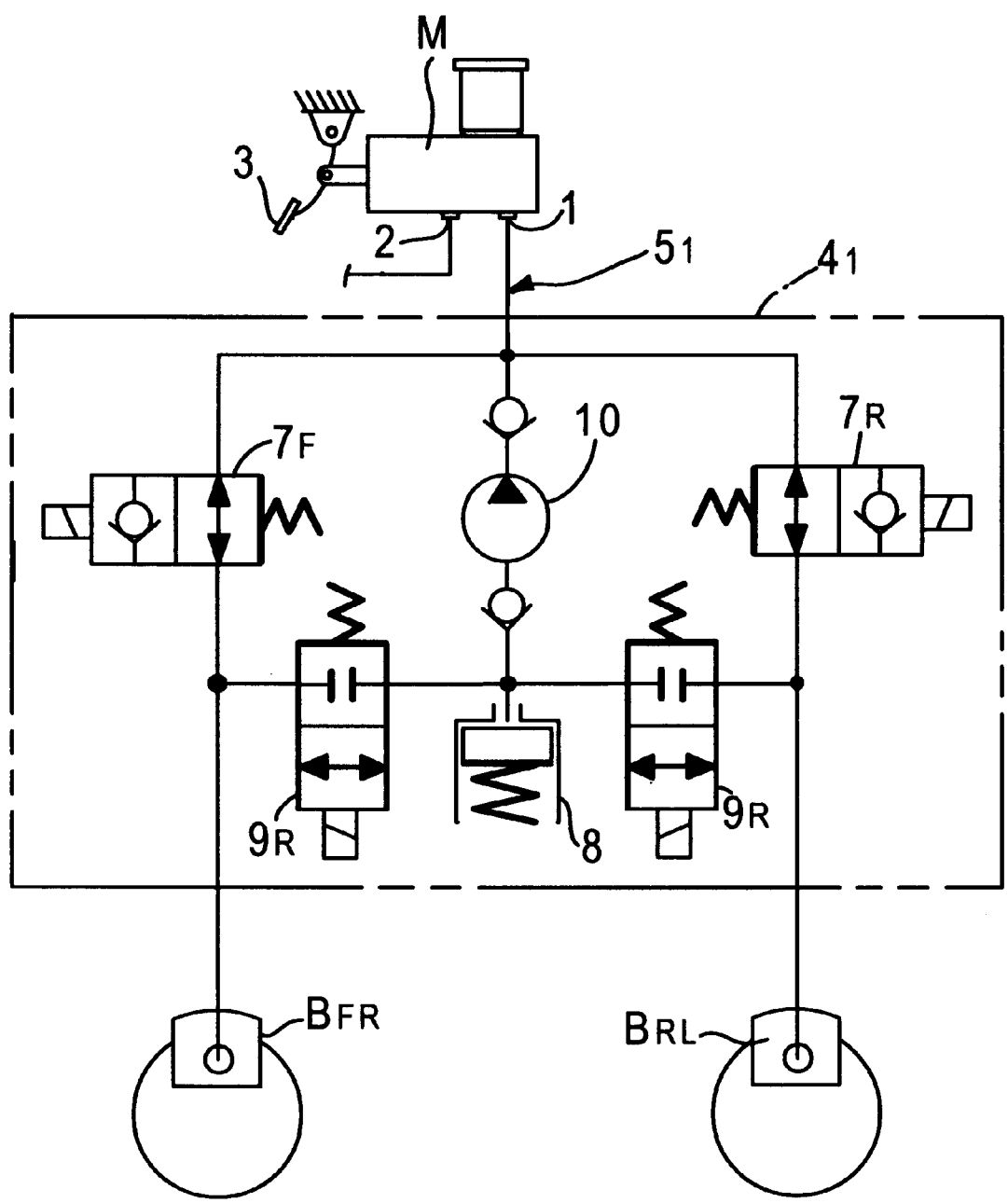
FIG. 2 is a diagrammatic illustration of the arrangement of a braking pressure regulating means.

Referring to FIG. 2, the braking pressure regulating means $4_1$, in the first braking liquid pressure system $5_1$, is a conventionally well-known antilock brake control system which includes a) an electromagnetic supply valve $7_F$ for permitting a braking liquid pressure output from the first output port 1 in the master cylinder M to be applied to the right front wheel brake $B_{FR}$, b) an electromagnetic supply valve $7_R$ for permitting a braking liquid pressure output from the first output port 1 to be applied to the left rear wheel brake $B_{RL}$, c) a reservoir 8, d) an electromagnetic release valve $9_F$ capable of releasing the braking liquid pressure for the right front wheel brake $B_{FR}$ to the reservoir 8, e) an electromagnetic release valve $9_R$ capable of releasing the braking liquid pressure for the left rear wheel brake $B_{LR}$ to the reservoir 8, and f) a pump 10 capable of returning a working liquid pumped from the reservoir 8 toward the first output port 1. Each of the electromagnetic supply valves $7_F$ and $7_R$ is capable of being switched between a deenergized state in which the first output port 1 and each of the wheel brakes $B_{FR}$ and $B_{RL}$ are in communication with each other, and an energized state in which the flow of the braking liquid from the first output port 1 to each of the wheel brakes $B_{FR}$ and $B_{RL}$ is cut off. Each of the electromagnetic release valves $9_P$ and $9_R$ is capable of being switched between a deenergized state in which each of the wheel brakes $B_{FR}$ and $B_{RL}$ and the reservoir 8 are out of communication with each other, and an energized state in which each of the wheel brakes $B_{FR}$ and $B_{RL}$ and the reservoir 8 are in communication with each other.

In such a braking pressure regulating means $4_1$, the antilock brake control of the right front wheel brake $B_{FR}$ and the left rear wheel brake $B_{RL}$ can be performed and the distribution of the braking force to the right front wheel brake $B_{FR}$ and the left rear wheel brake $B_{RL}$ can be regulated, by the control of the electromagnetic supply valves $7_F$ and $7_R$ and the electromagnetic release valves $9_F$ and $9_R$.

The braking pressure regulating means $4_2$ in the second braking liquid pressure system $5_2$ is constructed in the same way as the braking pressure regulating means $4_1$. Thus, the antilock brake control of the left front wheel brake $B_{FL}$ and the right rear wheel brake $B_{RR}$ can be performed, and the distribution of the braking force to the left front wheel brake $B_{FL}$ and the right rear wheel brake $B_{RR}$ can be regulated.

Figure 3:
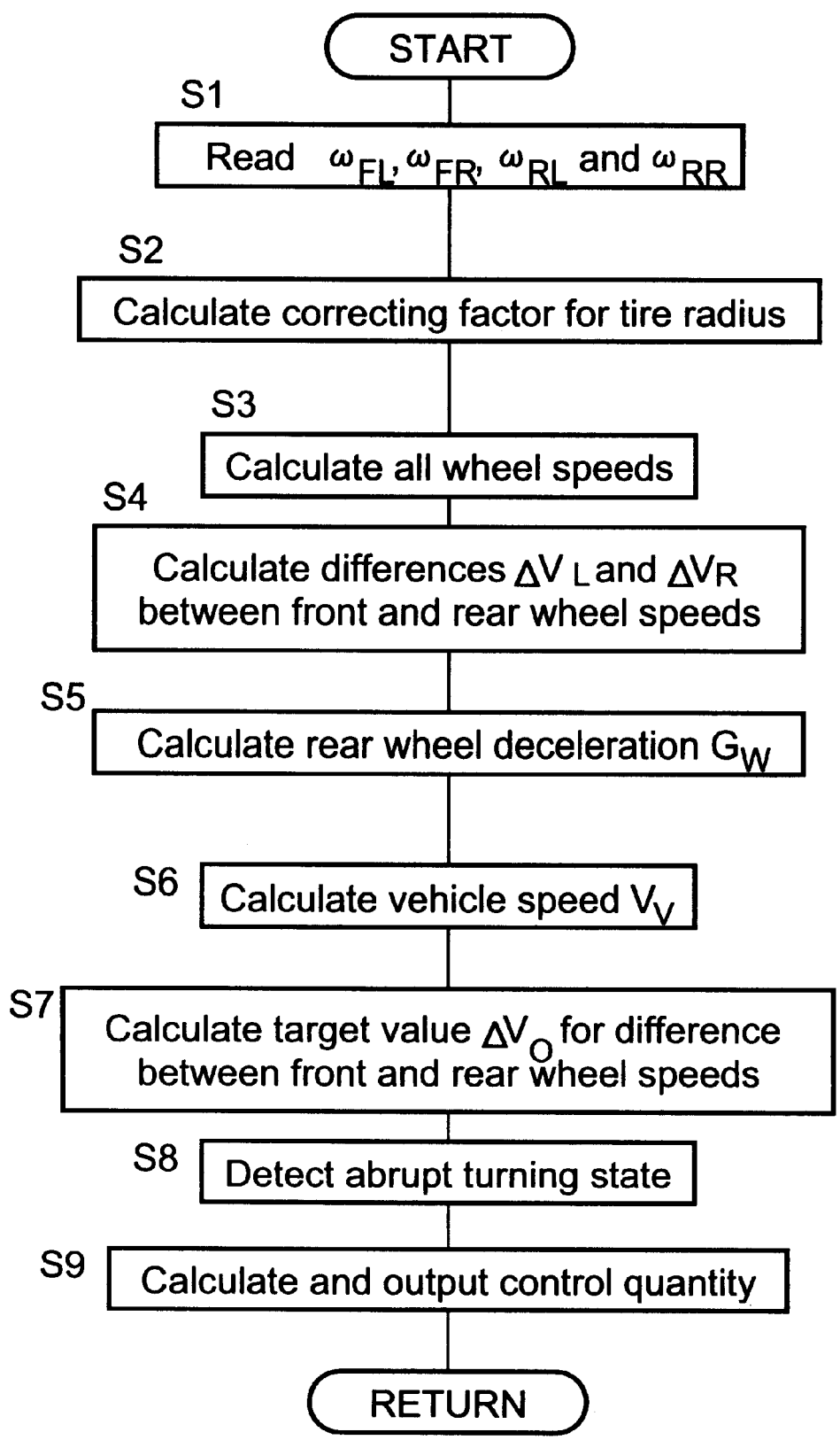
FIG. 3 is a flow chart illustrating a procedure for the control of the braking-force distribution.
Figure 4:
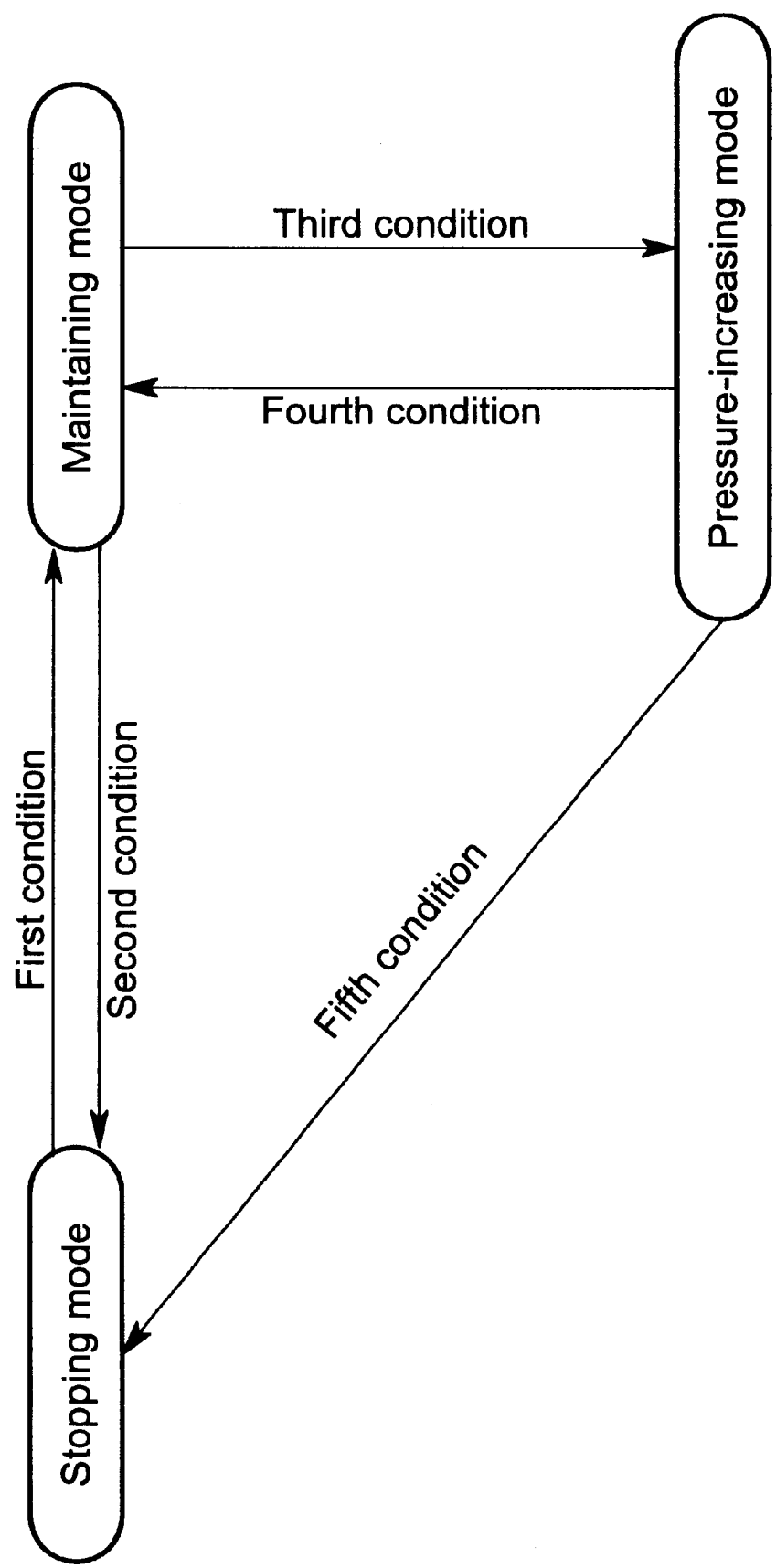
FIG. 4 is a diagram illustrating the interrelation of control modes.

The electronic control unit 6 performs a control calculation according to a procedure shown in FIG. 3. At step S1, left and right front wheel rotational speeds $\omega_{FL}$ and $\omega_{FR}$ and left and right rear wheel rotational speeds $\omega_{RL}$ and $\omega_{RR}$ are read. At step S2, a correcting factor for the radius of a tire is calculated. Specifically, a correcting factor for correcting the variability in radius of the tire is calculated by comparing the rotational speeds $\omega_{FL}$, $\omega_{FR}$, $\omega_{RL}$ and $\omega_{RR}$ of the wheels $W_{FL}$, $W_{FR}$, $W_{RL}$ and $W_{RR}$ when the vehicle is traveling at a constant speed.

At step S3, wheel speeds of all the wheels $W_{FL}$, $W_{FR}$, $W_{RL}$ and $W_{RR}$ are calculated. More specifically, a left front wheel speed $V_{WFL}$, a right front wheel speed $V_{WFR}$ a left rear wheel speed $V_{WRL}$ and a right rear wheel speed $V_{WRR}$ are calculated according to the following equations:

$$W_{WFL} = r_{FL} \times \omega_{FL}$$

$$V_{WFR} = r_{FR} \times \omega_{FR}$$

$$V_{WRL} = r_{RL} \times \omega_{RL}$$

$$V_{WRR} = r_{RR} \times \omega_{RR}$$

wherein each of $r_{FL}$, $r_{FR}$, $r_{RL}$ and $r_{RR}$ is a dynamic tire radius of each wheel, which results from the correction of a preset value of dynamic tire radius by the correcting factor determined at step S2.

At step S4, differences $\Delta V_L$ and $\Delta V_R$ between the left and right front wheel speeds and between the left and right rear wheel speeds are calculated according to the following equations:

$$\Delta V_L = V_{WRL} - V_{WFL}$$

$$\Delta V_R = V_{WRR} - V_{WFR}$$

At step S5, a rear wheel deceleration $G_W$ is determined from amounts of variation in rear wheel speeds $V_{WRL}$ and $V_{WRR}$ between calculation cycles. At step S6, a vehicle speed $V_V$ is calculated as $\{(V_{WRL} + V_{WRR})/2\}$.

At step S7, a target value $\Delta V_0$ for the difference between the front and rear wheel speeds is calculated according to the following equation:

$$\Delta V_0 = \lambda \times V_V - d$$

wherein each of $\lambda$ and d is a constant value. If the wheel speed difference target value $\Delta V_0$ is large, the braking-force distribution control is carried out for increasing the rear wheel speeds i.e. for increasing the front wheel braking force.

At step S8, a determination is made whether the vehicle is in an abrupt turning state. In the detection of the abrupt turning state, a yaw rate γ of the vehicle is first calculated according to the following equation:

$$\gamma = (V_{WRL} - V_{WRR})/tread$$

Then, a product GY of the vehicle speed $V_V$ and the yaw rate γ and a variation rate ΔGY of the product GY between calculation cycles, i.e., a differentiation value, are calculated according to the following equations:

$$GY = V_V \times \gamma$$

$$\Delta GY = (Gy_n - Gy_{n-1})/\Delta t$$

wherein $Gy_n$ is a current product; $Gy_{n-1}$ is a last product; and Δt is a calculation cycle.

When the variation rate ΔGY exceeds a preset value, it is determined that the vehicle is in the abrupt turning state, and an abrupt turning flag is set. In this case, the preset value is set at a value which is seldom produced in a usual turning state of the vehicle, e.g., at about 2 g/sec. Thus, when the yaw rate γ is suddenly increased during braking due to an abrupt turning state, which causes the vehicle to fall into a critical situation, the abrupt turning flag is set. In such situation, the gripping of a rear inner wheel during turning of the vehicle first approaches a limit, and the inner wheel speed is suddenly decreased. Thus, the yaw rate γ is suddenly increased, resulting in the variation rate ΔGY assuming a larger value and hence, the abrupt turning flag is set. This means that the critical situation of the rear wheel tires is sensitively detected and hence, as compared with when the yaw rate is directly detected by a sensor, control can immediately be started. After the abrupt turning flag has been initially set, the abrupt turning flag is reset when the absolute value of the product Gy becomes smaller than a value provided upon setting of the abrupt turning flag, or when a given time, e.g., about 1 second, has lapsed after setting of the abrupt turning flag.

At step S9, the calculation of control quantities of the braking pressure regulating means $4_1$ and $4_2$ is carried out. In the control of the braking pressure regulating means $4_1$ and $4_2$, three control modes shown in FIG. 4, i.e., a stopping mode, a maintaining mode and a pressure-increasing mode are switched from one to another, thereby controlling the braking pressure regulating means $4_1$ and $4_2$. The stopping mode is a mode in which control is not carried out, i.e., in which the braking liquid pressure from the master cylinder M is applied directly, to the left and right rear wheel brakes $B_{RL}$ and $B_{RR}$. The maintaining mode is a mode in which the master cylinder M and the rear wheel brakes $B_{RL}$ and $B_{RR}$ are out of communication with each other to maintain the braking liquid pressure for the rear wheel brakes $B_{RL}$ and $B_{RR}$. When the mode is switched to the maintaining mode upon increasing of the braking liquid pressure from the master cylinder M, the braking liquid pressure for the front wheel brakes $B_{FL}$ and $B_{FR}$ is increased, whereas the braking liquid pressure for the rear wheel brakes $B_{RL}$ and $B_{RR}$ is maintained, whereby the ratio of the distribution of the braking liquid pressure to the rear wheel brakes $B_{RL}$ and $B_{RR}$ is decreased. Further, the pressure-increasing mode is a mode in which the braking pressure for the rear wheel brakes $B_{RL}$ and $B_{RR}$ is increased slowly at a certain gradient by gradually transmitting the braking liquid pressure from the master cylinder M to the rear wheel brakes $B_{RL}$ and $B_{RR}$. The gradient is determined by a PID calculation based on a difference between $\Delta V_L$ or $\Delta V_R$ and the target value $\Delta V_0$ for the difference between front and rear wheel speeds.

The stopping mode is switched to the maintaining mode in response to the establishment of a first condition. This first condition is that $\Delta V_L$ (or $\Delta V_R$)<$\Delta V_0$ and the rear wheel deceleration $G_W$ exceeds a first preset value $G_1$ (e.g., 0.4 g), or the rear wheel deceleration $G_W$ exceeds a second preset value $G_2$ (e.g., 0.5 g) larger than the first preset value $G_1$.

The maintaining mode is switched to the stopping mode in response to the establishment of a second condition. The second condition is that the braking operation force has been decreased, e.g., that a rear wheel deceleration has become equal to or lower than a certain value (e.g., 0.2 g), or that the brake pump signal is OFF, or that the vehicle speed $V_V$ has become equal to or lower than about 5 km/hr and as a result, the vehicle has been substantially stopped.

The maintaining mode is switched to the pressure-increasing mode in response to the establishment of a third condition. The third condition is that $\Delta V_L$ (or $\Delta V_R$)>$\Delta V_1$ and the rear wheel deceleration $G_W$ is equal to or higher than a certain value $G_1$ (e.g., 0.3 g), and moreover, the abrupt turning flag is not set. Here, $\Delta V_1$ is a value resulting from the addition of a small value (e.g., 0.3 km/hr) to the wheel speed difference target value $\Delta V_0$. This means that the wheel speed difference target value $\Delta V_0$ is provided with a hysteresis in order to avoid control becoming sensitive.

The pressure-increasing mode is switched to the maintaining mode in response to the establishment of a fourth condition. The fourth condition is that $\Delta V_L$ (or $\Delta V_R$)<$\Delta V_0$, or the rear wheel deceleration $G_W$ is equal to or higher than a certain value $G_1$ (e.g., 0.2 g), or the abrupt turning flag has been set.

The pressure-increasing mode is switched to the stopping mode in response to a fifth condition. The fifth condition is that the pressure-increasing mode is continued for a predetermined period of time, e.g., for 2 seconds or more. This inhibits unnecessary operation of the braking pressure regulating means $4_1$ and $4_2$, when the pressure increasing time has already been sufficiently continued, so that the braking liquid pressure for the rear wheel brakes $B_{RL}$ and $B_{RR}$ is equal to the liquid pressure output from the master cylinder M.

Figure 5:
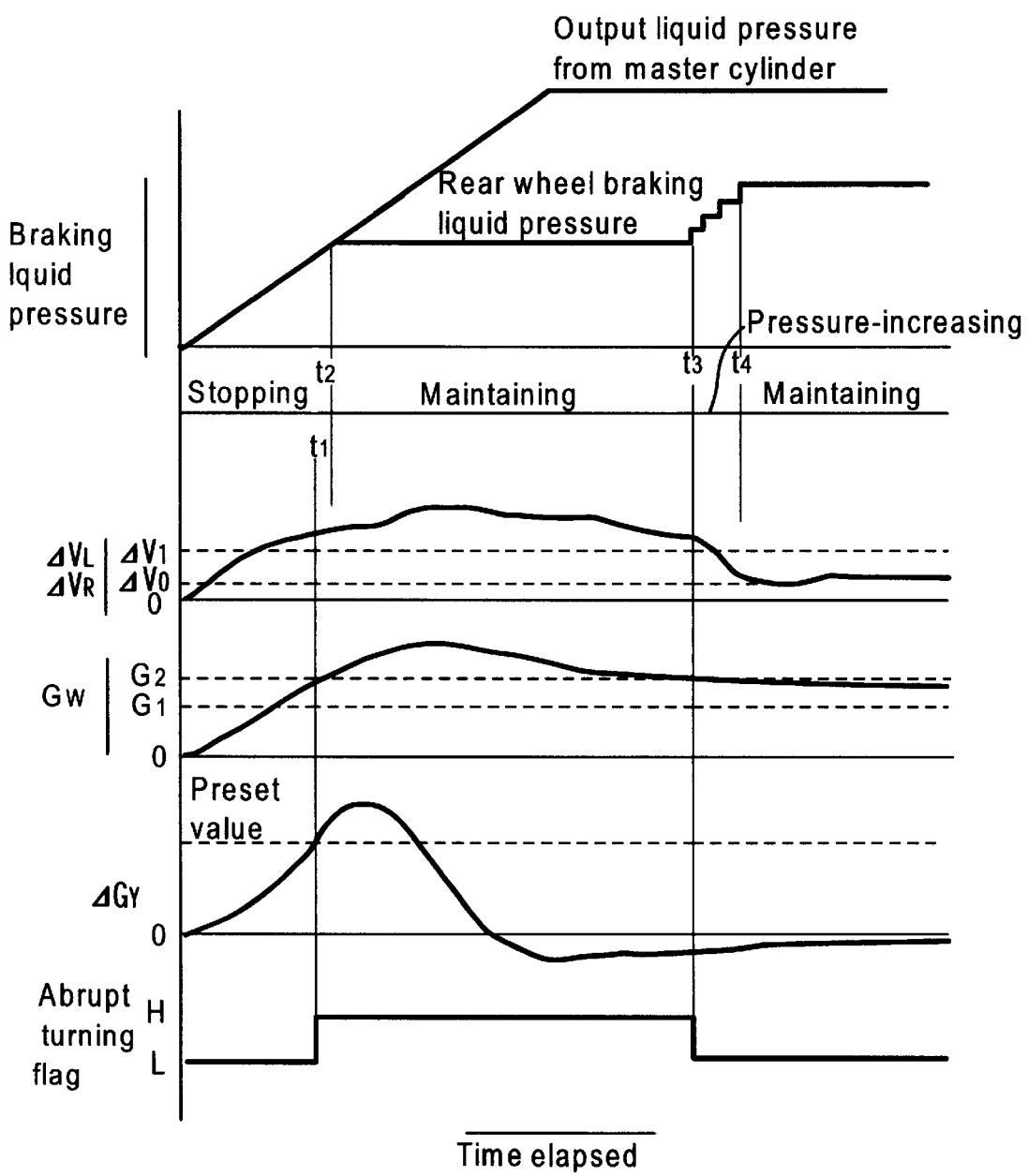
FIG. 5 is a timing chart.

The operation of this embodiment will be described below with reference to FIG. 5. The abrupt turning flag is set at a time $t_1$ when ΔGY, which is the differentiation value of the product GY of the vehicle speed $V_V$ and the yaw rate γ, exceeds the preset value in the course of increasing of the liquid pressure output from the master cylinder M in accordance with the braking operation during turning of the vehicle. In response to setting of the abrupt turning flag, the maintaining mode can be started, i.e., control can be started for decreasing the braking liquid pressure distribution ratio for the rear wheel brakes $B_{RL}$ and $B_{RR}$, as compared with when the abrupt turning state is not detected. However, the control mode is the stopping mode up to a time $t_2$ when the rear wheel deceleration $G_W$ exceeds the second preset value $G_2$. At the time $t_2$, the control mode is switched from the stopping mode to the maintaining mode. In other words, a timing for starting the front and rear wheel braking-force distribution is defined depending upon the situation of the rear wheel tires, and unnecessary control is effectively inhibited.

As a result of switching to the maintaining mode, the braking liquid pressure distribution ratio for the rear wheel brakes $B_{RL}$ and $B_{RR}$ is decreased, as compared with when the abrupt turning state is not detected. The braking force for the rear wheels is suppressed when braking during sudden turning of the vehicle. Thus, it is possible to supress a reduction in lateral force of the rear wheel tires to inhibit a sudden increase in yaw rate, thereby stabilizing the vehicle.

At a time $t_3$, after a lapse of a given time from the setting of the abrupt turning flag, the abrupt turning flag is reset. Thus, the control mode is switched from the maintaining mode to the pressure-increasing mode at the time $t_3$, based on the establishment of the third condition, i.e., based on the fact that $\Delta V_L$ (or $\Delta V_R) > \Delta V_1$ and the rear wheel deceleration $G_W$ is equal to or higher than a certain value (e.g., 0.3 g). Moreover, the abrupt turning flag is not set. As a result, the braking liquid pressure for the rear wheel brakes $B_{RL}$ and $B_{RR}$ is gradually increased. Therefore, the distribution of braking force to the front wheels, increased by control in the maintaining mode, is corrected to an appropriate distribution by increasing of the braking liquid pressure for the rear wheel brakes $B_{RL}$ and $B_{RR}$.

Further, when at least one of the elements of the fourth condition, e.g., $\Delta V_L$ (or $\Delta V_R) < \Delta V_0$ is established at a time $t_4$, the control mode is again switched from the pressure-increasing mode to the maintaining mode.

In such a control of the braking-force distribution, it is possible to accommodate the change in physical limit for the yaw rate $\gamma$ in accordance with the vehicle speed $V_V$, by detecting the abrupt turning state of the vehicle based on the differentiation value $\Delta GY$ of the product $GY$ of the vehicle speed $V_V$ and the yaw rate $\gamma$. Particularly, it is possible to effectively insure the stability of the vehicle during high speed traveling in which the physical limit for the yaw rate $\gamma$ is lowered. In addition, since the vehicle speed $V_V$ is determined as the average value of at least one of the front wheel speeds and the rear wheel speeds, and the yaw rate $\gamma$ is presumed to be based on the difference between the left and right rear wheel speeds, so that an expensive sensor for directly detecting the yaw rate $\gamma$ is not required. Also, since the presumed value of the yaw rate using the left and right rear wheels is suddenly increased when the gripping of one of the rear inner wheels, as viewed during traveling of the vehicle, approaches a limit, so that slipping starts to increase, it is possible to more sensitively detect the critical situation of the rear wheel tires, compared with when the yaw rate is directly detected, thereby immediately starting control.

The example using the antilock brake control system has been shown as the braking pressure regulating means, but a braking pressure regulating means capable of regulating only the liquid pressure for the rear wheel brakes may be used. Although the brake system of the X-piping type has been described in the above-described embodiment, the present invention is also applicable to brake systems of any piping type. Further, the control for suppressing the liquid pressure for the rear wheel brakes upon the setting of the abrupt turning flag may be conducted only on the side of the inner wheel as viewed during turning of the vehicle.

Although the embodiment of the present invention has been described above, it will be understood that the present invention is not limited to the above-described embodiment, and various modifications may be made without departing from the spirit and scope of the invention defined in the claims.

What is claimed is:

1. A process for controlling a braking-force distribution in a vehicle, wherein a front and rear wheel braking-force distribution is controlled by regulating a braking liquid pressure ratio for front and rear wheel brakes, based on a difference between front and rear wheel speeds, said process comprising the steps of:

detecting rotational speed of each wheel;

calculating wheel speeds of all wheels from the detected rotational speeds;

calculating a vehicle speed:

calculating said difference between said front and rear wheel speeds;

calculating a target value for said difference between said front and rear wheel speeds;

controlling said front and rear wheel braking-force distribution based on a comparison of said difference between said front and rear wheel speeds with said target value;

calculating a yaw rate from a difference between left and right rear wheel speeds;

obtaining a differentiation value of a product of said vehicle speed and said yaw rate:

determining whether the vehicle is in an abrupt turning state, based on a comparison of said differentiation value with a preset value; and decreasing the braking liquid pressure distribution ratio for the rear brakes when the abrupt turning state is determined, as compared with a braking liquid pressure distribution ratio for the rear brakes when the abrupt turning state is not detected, wherein said vehicle speed is based on at least one of the front wheel speeds and the rear wheel speeds.

2. A process for controlling a braking-force distribution according to claim 1, wherein a rear wheel deceleration is calculated based on the rear wheel speeds, and the regulation of the braking liquid pressure distribution ratio is carried out under a condition that said rear wheel deceleration exceeds a preset value.

3. A process for controlling a braking-force distribution according to claim 1, wherein said preset value is 2 g/sec.

4. A process for controlling a braking-force distribution according to claim 1, further comprising the step of resetting the abrupt turning state when an absolute value of the differentiation value of the product of the vehicle speed and the yaw rate of the vehicle body is smaller than the value when the abrupt turning state is determined or when a predetermined time has lapsed.

5. A process for controlling a braking-force distribution according to claim 1, wherein said yaw rate is a value obtained by dividing said difference between the left and right rear wheel speeds by a tread value of the vehicle.

* * * * *